(12) United States Patent
Kim et al.

(10) Patent No.: US 12,282,355 B2
(45) Date of Patent: Apr. 22, 2025

(54) DISPLAY DEVICE

(71) Applicant: Samsung Display Co., LTD., Yongin-si (KR)

(72) Inventors: Tae-Sung Kim, Hwaseong-si (KR); Koichi Abe, Hwaseong-si (KR); Young Ji Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 223 days.

(21) Appl. No.: 17/989,730

(22) Filed: Nov. 18, 2022

(65) Prior Publication Data

US 2023/0205259 A1    Jun. 29, 2023

(30) Foreign Application Priority Data

Dec. 28, 2021   (KR) .................. 10-2021-0190216

(51) Int. Cl.
*G06F 1/16*       (2006.01)
*H04R 9/06*       (2006.01)

(52) U.S. Cl.
CPC .......... *G06F 1/1605* (2013.01); *G06F 1/1607* (2013.01); *H04R 9/06* (2013.01); *H04R 2499/15* (2013.01)

(58) Field of Classification Search
CPC ............. G02F 1/133308; G02F 1/1333; G02F 1/133317; G02F 1/133314; H04R 2499/15; H04R 2400/03; H04R 2499/11; H04R 1/025; H04R 17/00; H04R 9/06; G06F 1/1605; H05K 1/189; H05K 2201/10128
See application file for complete search history.

(56) References Cited

U.S. PATENT DOCUMENTS

| | | | |
|---|---|---|---|
| 10,416,707 B2 | 9/2019 | Choi et al. | |
| 10,567,880 B2 | 2/2020 | Ham et al. | |
| 11,044,820 B2 | 6/2021 | Yu et al. | |
| 11,783,734 B2 * | 10/2023 | Han ..................... | G09F 9/301 |
| | | | 345/173 |
| 2019/0079556 A1 | 3/2019 | Choi et al. | |
| 2021/0407488 A1 * | 12/2021 | Choi ..................... | G10K 9/122 |
| 2021/0409854 A1 * | 12/2021 | Choi ..................... | H04R 1/028 |
| 2022/0069194 A1 * | 3/2022 | Lee ..................... | H04R 3/04 |
| 2024/0015426 A1 * | 1/2024 | Ikuma ..................... | H04R 5/02 |
| 2024/0080611 A1 * | 3/2024 | Lee ..................... | H04R 17/00 |
| 2024/0080612 A1 * | 3/2024 | Lee ..................... | H04R 9/043 |
| 2024/0177700 A1 * | 5/2024 | Choi ..................... | G06F 1/1605 |

FOREIGN PATENT DOCUMENTS

| | | |
|---|---|---|
| KR | 101704517 | 2/2017 |
| KR | 101746496 | 6/2017 |
| KR | 101780302 | 9/2017 |

(Continued)

*Primary Examiner* — Mandeep S Buttar
(74) *Attorney, Agent, or Firm* — CANTOR COLBURN LLP

(57) ABSTRACT

A display device according to an embodiment includes: a display panel including a first region and a second region; a chassis disposed on a rear surface of the display panel; a first exciter in contact with the first region and fixed to the chassis; and a second exciter in contact with the second region and fixed to the chassis. The chassis defines an opening disposed between the first exciter and the second exciter.

19 Claims, 15 Drawing Sheets

(56) References Cited

FOREIGN PATENT DOCUMENTS

| KR | 101780297 | 10/2017 |
|---|---|---|
| KR | 1020170115124 | 10/2017 |
| KR | 1020170135465 | 12/2017 |
| KR | 101817102 | 1/2018 |
| KR | 101817103 | 1/2018 |
| KR | 101817105 | 2/2018 |
| KR | 1020190052467 | 5/2019 |
| KR | 1020190070567 | 6/2019 |
| KR | 1020190074540 | 6/2019 |

* cited by examiner

DISPLAY DEVICE

This application claims priority to Korean Patent Application No. 10-2021-0190216, filed on Dec. 28, 2021, and all the benefits accruing therefrom under 35 U.S.C. § 119, the content of which in its entirety is herein incorporated by reference.

BACKGROUND

(a) Technical Field

This disclosure relates to a display device, and more particularly, to a display device that generates a sound by vibrating a display panel.

(b) Description of the Related Art

A display device may provide a screen for displaying an image on an electronic device such as a television, monitor, laptop computer, tablet, smartphone, navigation device, or the like.

The display device may include a sound device for outputting a sound related to the image in addition to the display panel for displaying the image. The sound device may be disposed on the side of the display panel, but it may also be disposed on the back side (i.e., rear side) of the display panel depending on the design of the electronic device. Accordingly, the direction in which the image is displayed and the direction in which the sound is output may not match. In addition, the sound quality may deteriorate due to interference between the sound output from the sound device and propagating to the viewer and the sound reflected by a wall or the like.

To reduce the bezel of the electronic device, for example, a television or a monitor, while matching the direction in which the image is displayed and the direction in which the sound is output, the display panel may be used as a diaphragm of the sound device.

The above information disclosed in this Background section is only for enhancement of understanding of the background, and therefore it may contain information that does not form the prior art that is already known in this country to a person of ordinary skill in the art.

SUMMARY

To obtain a stereophonic sound, the display panel may be divided into a plurality of sections and each section may be vibrated according to a corresponding sound signal. At this time, the vibration of the section corresponding to one sound signal may affect the section corresponding to another sound signal, so that the acoustic performance may deteriorate.

Embodiments are for reducing interference between acoustic channels in the display device using the display panel as the diaphragm.

A display device according to an embodiment includes: a display panel including a first region and a second region; a chassis disposed on a rear surface of the display panel; a first exciter in contact with the first region and fixed to the chassis; and a second exciter in contact with the second region and fixed to the chassis. The chassis defines an opening disposed between the first and second exciters.

The first exciter and the second exciter may be disposed in a line in a first direction, and the opening may extend in a second direction intersecting the first direction.

The display device may further include: a first partition disposed between the display panel and the chassis and surrounding the first exciter; and a second partition disposed between the display panel and the chassis and surrounding the second exciter. The opening may be disposed between the first partition and the second partition.

The first partition and the second partition may be spaced apart from each other.

In the second direction in which the opening extends, the opening may be formed spaced apart from one end and an opposite end of the chassis.

The opening may be provided in plural between the first exciter and the second exciter.

The first exciter and the second exciter may be disposed in a line in the first direction, and the plurality of openings may be disposed in a line in a second direction intersecting the first direction.

One of the plurality of openings may intersect the imaginary line connecting the first exciter and the second exciter.

The opening may extend from one end of the chassis to an opposite end of the chassis, and the chassis may be completely divided into a first portion and a second portion by the opening.

The display device may further include a damper overlapping the opening in a plan view and connected to the display panel and the chassis.

The display device may further include a first partition surrounding the first exciter and a second partition surrounding the second exciter, and the damper may be disposed between the first partition and the second partition.

The first exciter and the second exciter may each include a portion inserted into a hole defined in the chassis.

The first exciter and the second exciter may be in contact with the display panel through an adhesive member disposed between the display panel and the first exciter and disposed between the display panel and the second exciter.

The first exciter and the second exciter may be directly in contact with the display panel.

The display device may further include a cover disposed on the rear surface of the chassis, and the chassis may be attached to the cover by an adhesive member.

The first exciter and the second exciter may each include a portion inserted into a hole defined in the cover.

A display device according to an embodiment includes: a display panel providing a screen to display images; a chassis including a first portion and a second portion disposed on a rear surface of the display panel and separated from each other; a first exciter in contact with the display panel and fixed to the first portion; and a second exciter in contact with the display panel and fixed to the second portion.

The display device may further include a damper disposed between the first portion and the second portion and connected to the display panel and the chassis.

The display device may further include a cover disposed on a rear surface of the chassis and to which the chassis is attached.

The display device may further include: a first partition disposed between the display panel and the first portion and surrounding the first exciter; and a second partition disposed between the display panel and the second portion and surrounding the second exciter. The first partition and the second partition may be spaced apart from each other.

According to embodiments, it is possible to reduce interference between acoustic channels in the display device using the display panel as a diaphragm, thereby effectively improving sound distortion and improving sound quality. In addition, according to embodiments, there is an advantageous effect that can be recognized throughout the specification.

DETAILED DESCRIPTION

Figure 1:
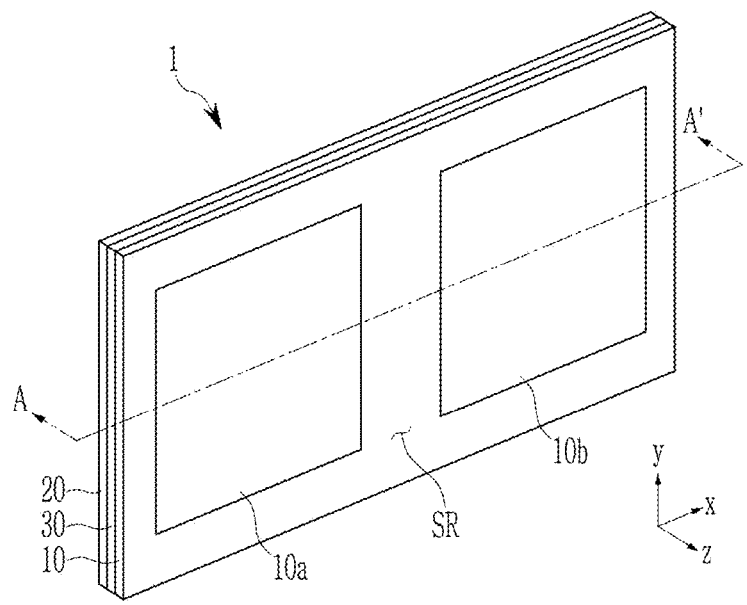
FIG. 1 is a schematic front perspective view of a display device according to an embodiment.

Embodiments will be described in detail with reference to accompanying drawings so that those skilled in the art can easily implement them.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. In addition, unless explicitly described to the contrary, the word "comprise" and variations such as "comprises" or "comprising" will be understood to imply the inclusion of stated elements but not the exclusion of any other elements.

Throughout the specification, "connected" does not only mean that two or more constituent elements are directly connected, but when two or more constituent elements are connected indirectly through other constituent elements, and it may include a case where substantially integral parts are connected to each other even if they may be referred to by a different name depending on the position or function, as well as the case of being physically connected or electrically connected.

In the drawings, symbols "x", "y", and "z" representing directions are used, where "x" is a first direction, "y" is a second direction perpendicular to the first direction, and "z" is a third direction perpendicular to the first direction and the second direction.

Figure 2:
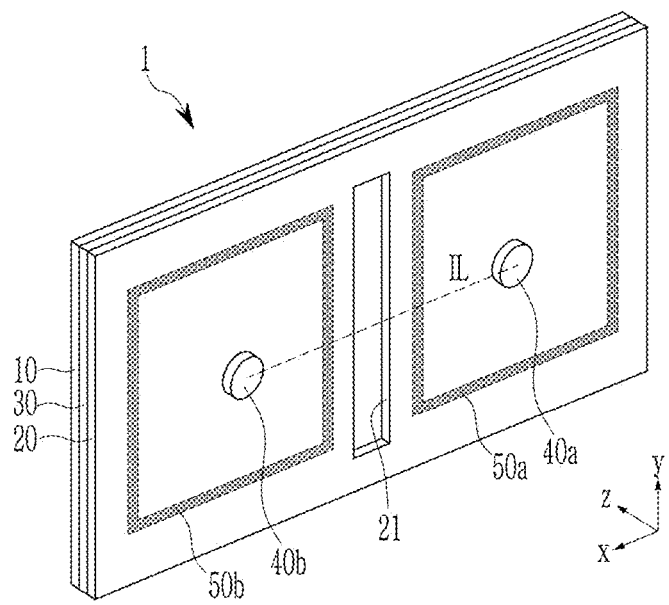
FIG. 2 is a schematic rear perspective view of a display device according to an embodiment.
Figure 3:
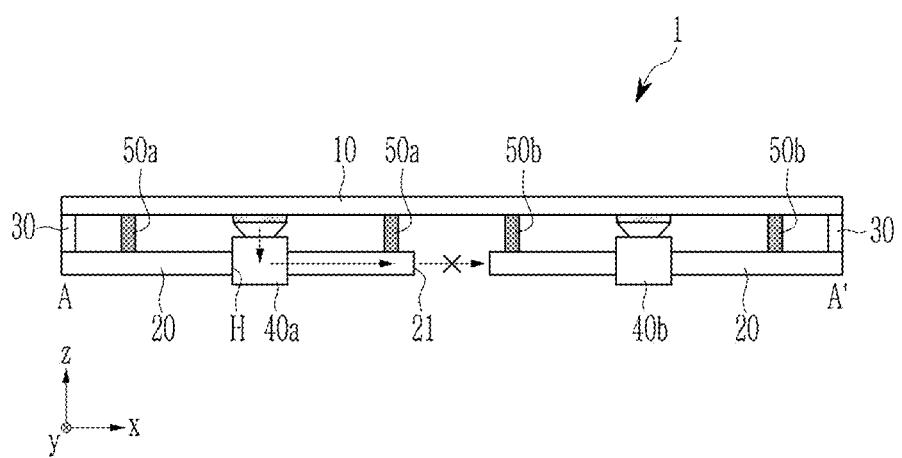
FIG. 3 is a schematic cross-sectional view taken along line A-A' of FIG. 1.

FIG. 1 is a schematic front perspective view of a display device according to an embodiment, FIG. 2 is a schematic rear perspective view of a display device according to an embodiment, and FIG. 3 is a schematic cross-sectional view taken along line A-A' of FIG. 1.**

Referring to FIG. 1, FIG. 2, and FIG. 3, a display device 1 according to an embodiment is schematically shown. The display device 1 may include a display device in a narrow sense including a display panel 10 and a driving device for driving the display panel 10. In addition, the display device 1 may include a set device including a narrow display device such as a television, a monitor, a laptop computer, a tablet, a smart phone, a navigation system, etc.

The display device 1 may include a display panel 10, a chassis 20, exciters 40a and 40b, and partitions 50a and 50b.

The display panel 10 may provide a screen SR that displays the image. The display panel 10 may display an image in the front thereof corresponding to a third direction z. The display panel 10 may be a light emitting display panel including organic or inorganic light emitting diodes ("LEDs"). The display panel 10 may display image by a combination of pixels implemented by light emitting diodes (LEDs). The display panel 10 is not limited to the light emitting display panel, and may be a liquid crystal panel including a liquid crystal layer.

The chassis 20 may be positioned on the back of the display panel 10. The chassis 20 may support the back and/or the side of the display panel 10. The chassis 20 may include materials such as a metal, a metal alloy, glass, plastic, fiber-reinforced plastic, or the like.

The display panel 10 and the chassis 20 may be attached to each other by an adhesive member 30. The adhesive member 30 may be disposed around the edges of the display panel 10 and the chassis 20. As the adhesive member 30, a foam tape, a double-sided adhesive tape, etc. may be used.

The exciter 40a and 40b are disposed on the back side (i.e., rear side facing a direction opposite to the third direction z) of the display panel 10 to vibrate the display panel 10. The exciter 40a and 40b may be referred to as an actuator, a transducer, a sound generating module, or the like. The structure and operation of the exciters 40a and 40b are described later with reference to FIG. 4.

The exciters 40a and 40b may be fixed to the chassis 20. For example, the exciters 40a and 40b may be inserted and fixed in a hole H provided in the chassis 20. A part of the exciters 40a and 40b may penetrate the chassis 20 and protrude to the back side of the display device 1. The exciters 40a and 40b may be attached to the display panel 10 by an adhesive member such as a double-sided adhesive tape, and may be in contact with the display panel 10 through the adhesive member. The exciters 40a and 40b may also directly contact the display panel 10.

The exciters 40a and 40b may vibrate the display panel 10 in direct or indirect contact with the exciters 40a and 40b by vibrating according to an acoustic signal by using the chassis 20 as a support, and the display panel 10 may output the sound forward corresponding to the third direction z. The display device 1 uses the display panel 10 as a diaphragm of the acoustic device and outputs the sound to the front of the display panel 10 so that the image of the display device 1 and the position of the acoustic generation may be matched, and it is possible to improve the immersion of the viewer watching the image of the display device 1.

The exciters 40a and 40b may include a first exciter 40a and a second exciter 40b positioned on the left and right sides of the display device 1, respectively. The first region 10a (or the left region) of the display panel 10 may be vibrated by the driving of the first exciter 40a, and the second region 10b (or the right region) of the display panel 10 may be vibrated by the driving of the second exciter 40b. Accordingly, the display device 1 may output the sounds of 2 channels or more channels and may provide a stereoscopic sound. The first region 10a and the second region 10b may be spaced apart from each other, but may be contiguously adjacent.

The partitions 50a and 50b may be positioned between the display panel 10 and the chassis 20. The partitions 50a and 50b may form an air gap or a space where the sounds are generated when the display panel 10 vibrates by the exciters 40a and 40b. The partitions 50a and 50b may be referred to as enclosures or baffles. The space defined by the display panel 10, and the chassis 20 and the partitions 50a and 50b, may be substantially sealed or not by the display panel 10, the chassis 20 and the partitions 50a and 50b. The partitions 50a and 50b may be attached to the display panel 10 and/or the chassis 20. For example, an adhesive member such as an adhesive and a double-sided adhesive tape is provided on opposite sides of the partitions 50a and 50b, so that one side thereof may be attached to the display panel 10 and the other side may be attached to the chassis 20. In another embodiment, an adhesive member is provided only on one side of the partitions 50a and 50b so that it may be attached to the display panel 10 or chassis 20. The partitions 50a and 50b may be surrounded by the adhesive member 30.

The partitions 50a and 50b may include a first partition 50a and a second partition 50b positioned on the left and right sides of the display device 1, respectively. The first partition 50a and the second partition 50b may be spaced apart from each other in the first direction x. The first partition 50a and the second partition 50b may partition the display panel 10 into the first region 10a and the second region 10b, respectively. The first partition 50a and the second partition 50b may enclose the first exciter 40a and the second exciter 40b, respectively. The first partition 50a and the second partition 50b may separate the first sound (or a left acoustic) and the second sound (or a right acoustic) output by the vibration of the display panel 10. Meanwhile, when viewed in the third direction z (i.e., plan view), the first partition 50a and the second partition 50b may each be approximately quadrangular, but may have various shapes. For example, the first partition 50a and the second partition 50b may have a shape surrounding the exciters 40a and 40b, such as a polygon as a pentagon or more, a circle, an ellipse, etc., respectively.

Due to the rigidity of the display panel 10, which is the diaphragm and the chassis 20, the vibration of one region of the display panel 10 may affect the other region. For example, if the first region 10a vibrates by the driving of the first exciter 40a, the vibration is propagated or transmitted to the second region 10b through the display panel 10 and the chassis 20, which may cause parasitic vibrations in the second region or distort the waveform of the sound generated in the second region 10b. Accordingly, uncontrolled sounds may occur in the second region 10b. Conversely, if the second region 10b vibrates due to the driving of the second exciter 40b, the vibration propagates to the first region 10a through the display panel 10 and the chassis 20, which may cause parasitic vibrations in the first region 10a or distort the acoustic waveform generated in the first region 10a. Accordingly, the uncontrolled sounds may occur in the first region 10a.

To reduce the sound degradation caused by the parasitic vibration, the chassis 20 may define an opening 21 (or a slit or a cutout) formed between the first region (or the left region) and the second region (or the right region) of the display device 1. The opening 21 may be positioned between the first exciter 40a and the second exciter 40b. The opening 21 may be positioned between the first partition 50a and the second partition 50b. The opening 21 may be positioned approximately in the central portion of the display device 1 and may be formed to extend in the second direction y. To prevent the chassis 20 from being entirely separated as the right side and left side, the opening 21 may be formed to be spaced apart from the top and bottom of the chassis 20 at a predetermined interval. The opening 21 may be formed to intersect the imaginary line IL connecting the first exciter 40a and the second exciter 40b in the first direction x (See FIG. 2). In this way, when the opening 21 is formed, the propagation of the vibration through the chassis 20 in the first direction x may be suppressed, so that the sound degradation caused by the parasitic vibration may be reduced.

Although the example that two exciters 40a and 40b are disposed is illustrated, three or more exciters may be disposed to provide multi-channel acoustics in another embodiment. For example, a third exciter (not shown) may be disposed between the first exciter 40a and the second exciter 40b, so that a central vibration region (or a third vibration region) of the display panel 10 may be vibrated. The third exciter may be surrounded by a third partition (not shown) positioned between the display panel 10 and the chassis 20. As such, when the third exciter is disposed, the chassis 20 may define an opening between the first exciter 40a and the third exciter and an opening between the second exciter 40b and the third exciter, thereby reducing the occurrence of the parasitic vibrations between the vibration regions through the chassis 20 in the first direction x.

Figure 4:
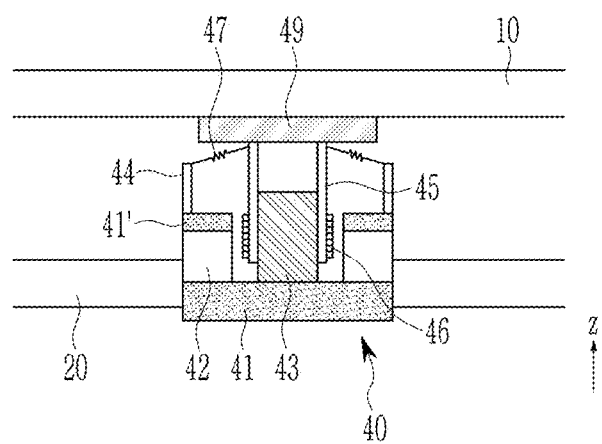
FIG. 4 and FIG. 5 are schematic cross-sectional views showing an arrangement and a configuration of an exciter in a display device according to an embodiment, respectively.
Figure 5:
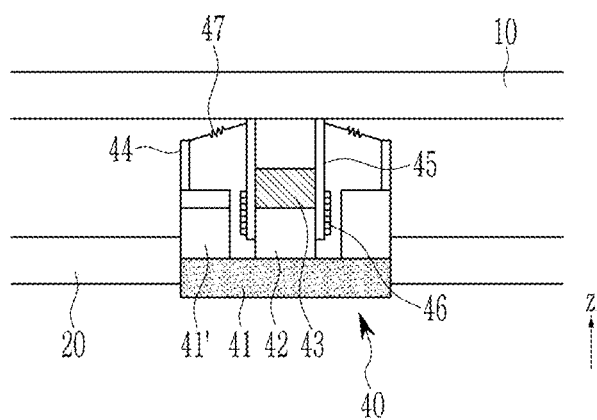

FIG. 4 and FIG. 5 are schematic cross-sectional views showing an arrangement and a configuration of an exciter in a display device according to an embodiment, respectively.

Referring to FIG. 4, the exciter 40 may correspond to the aforementioned first exciter 40a and second exciter 40b. The exciter 40 may be inserted and fixed into the hole H of the chassis 20, and may be attached to the display panel 10 through the adhesive member 49. The exciter 40 may include a first plate 41, a magnet 42, a center pole 43, a frame 44, a bobbin 45, a coil 46, a damper 47, a second plate 41', etc.

The first plate 41 and the second plate 41' may fix the exciter 40 to the chassis 20 while supporting the magnet 42. The first plate 41 may be fixed to the hole H defined in the chassis 20. The first plate 41 and/or the second plate 41' may be made of a magnetic material such as iron (Fe). The magnet 42 may be positioned between the first plate 41 and the second plate 41'. The magnet 42 may be a permanent magnet including a material such as ferrite, alnico, or neodymium (Nd).**

The center pole 43 may be disposed in the central region of the first plate 41, and the frame 44 may be positioned on the second plate 41'. The center pole 43 may be formed integrally with the first plate 41. The bobbin 45 may be disposed to wrap around the center pole 43. The bobbin 45 may be an annular structure formed of paper or an aluminum sheet. The coil 46 may be wound on the bobbin 45, and a sound signal as an electrical signal may be applied to the coil 46.

When explaining the operation of exciter 40, for example, the first plate 41 connected to the lower surface of the magnet 42 becomes the N pole, and the second plate 41' connected to the upper surface of the magnet 42 becomes the S pole, thereby an external magnetic field may be formed around the coil 46. In this state, when a sound signal (current) is applied to the coil 46, an applied magnetic field is generated around the coil 46, and a force to move the bobbin 45 upward or downward may be generated by the applied magnetic field and the external magnetic field. That is, when the sound signal is applied to the coil 46, the magnetic field is formed around the coil 46, and since there is the external magnetic field formed by the magnet 42, according to Fleming's law, the entire bobbin 45 may move upward or downward and vibrate while being guided by the center pole 43. Since one side of the bobbin 45 is in direct contact with the back side (i.e., rear side) of the display panel 10 through the adhesive member 49 or directly, the display panel 10 may be vibrated according to the sound signal applied to the coil 46, and the sound waves are generated by the vibration of the display panel 10 and then the sound may be output to the front of display device 1.

Meanwhile, the damper 47 may be disposed between the bobbin 45 and the frame 44. The damper 47 may be connected to the bobbin 45 and the frame 44. The damper 47 may adjust the up and down vibration of the bobbin 45 while contracting and relaxing according to the up and down movement of the bobbin 45. That is, since the damper 47 is connected to the bobbin 45 and the frame 44, respectively, the up and down vibration of the bobbin 45 may be controlled by the restoring force of the damper 47.

For example, when the bobbin 45 vibrates above a certain height or below a certain height, the bobbin 45 may return to an original position thereof by the restoring force of the damper 47.

Referring to FIG. 5, the exciter 40 has a difference from the exciter 40 shown in FIG. 4 in a point that the magnet 42 is positioned on the first plate 41, and the center pole 43 is positioned on the magnet 42. This structure may be more advantageous in reducing a leakage flux and a size than the structure in which the magnet 42 is disposed outside. Meanwhile, one side of the bobbin 45 of the exciter 40 may be in directly contact with the back side (i.e., rear side facing a direction opposite to the third direction z) of the display panel 10.

The structure and operation of the exciter 40 may be changed in various ways, and there is no limitation as long as it has the structure and operation that may output the sound by vibrating the display panel 10 according to the sound signal.

Figure 6:
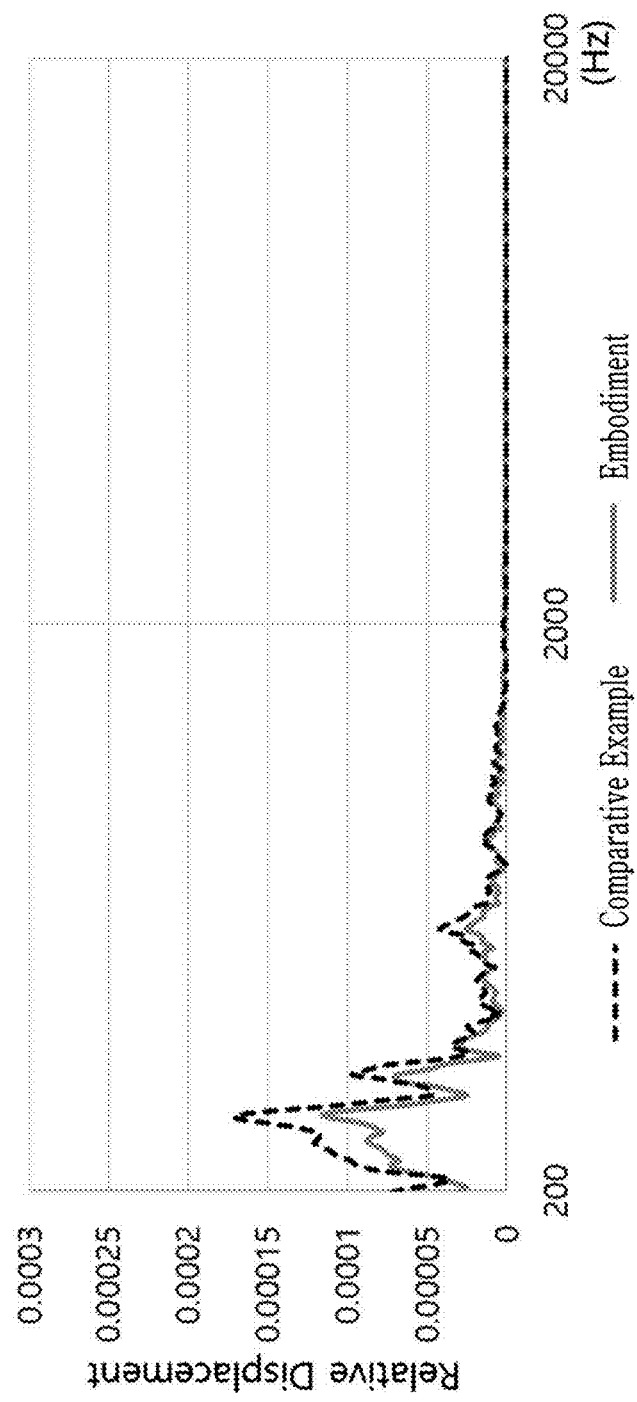
FIG. 6, FIG. 7, and FIG. 8 are graphs showing a vibration amount, a sound pressure, and entire harmonic distortion in a display device according to an embodiment and a display device according to an embodiment and a display device according to a comparative example, respectively.
Figure 7:
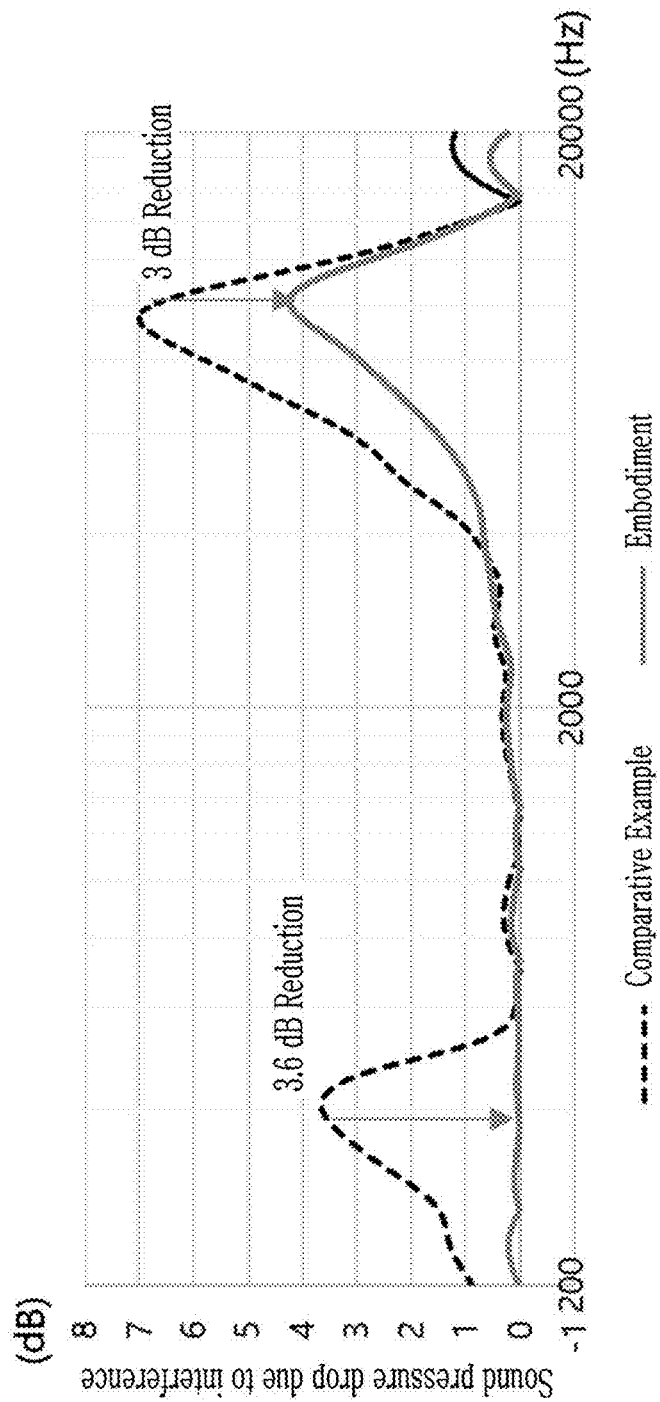
Figure 8:
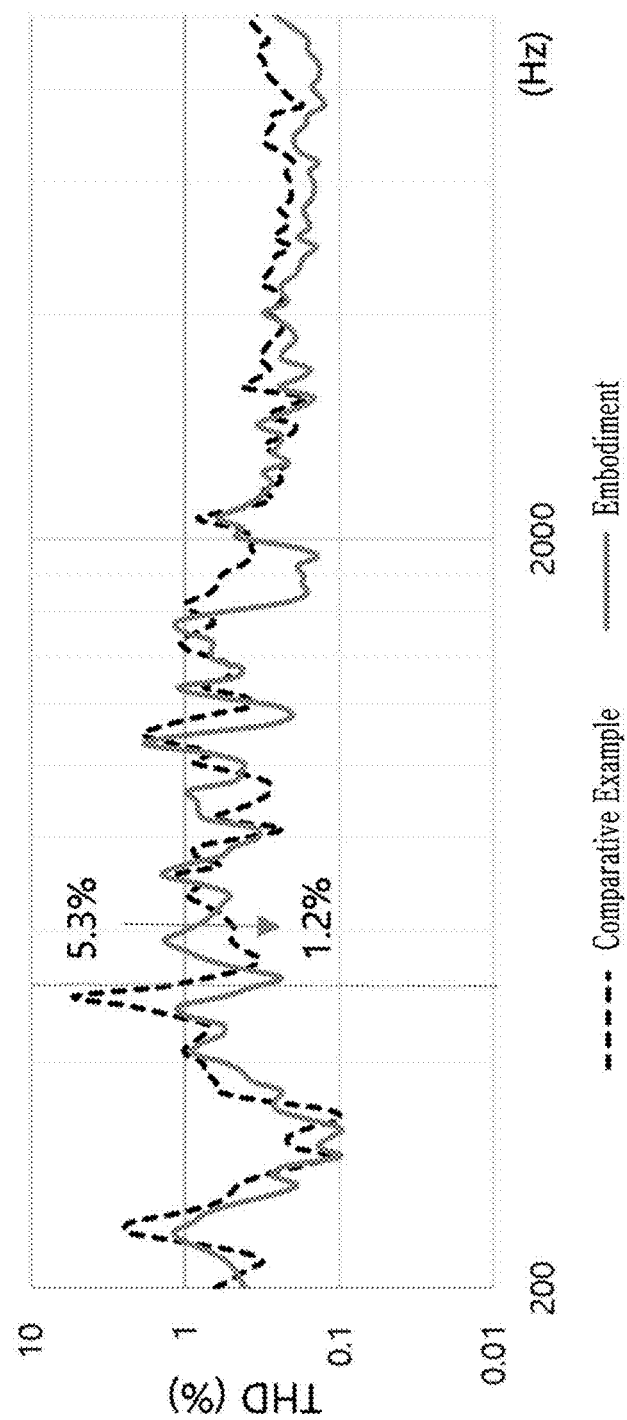

FIG. 6, FIG. 7, and FIG. 8 are graphs showing a vibration amount, a sound pressure, and an entire harmonic distortion in a display device according to an embodiment and a display device according to an embodiment and a display device according to a comparative example, respectively.

Referring to FIG. 6, a curve shown by a solid line shows the measurement result of the vibration amount of the second region 10b of the display panel 10 when the first exciter 40a that vibrates the first region 10a of the display panel 10 is driven in the display device 1 according to the above-described embodiment. A curve shown by a dotted line shows the measurement result of the vibration amount of the second region 10b of the display panel 10 when the first exciter 40a is driven in the display device according to a comparative example that is the same as the display device 1 according to the above-described embodiment as a whole except that the opening 21 is not formed in the chassis 20. By forming the opening 21 in the chassis 20 as in the embodiment, it was found that the parasitic vibration is suppressed compared to the display device of the comparative example, which is not.

Referring to FIG. 7, a curve shown as a solid line represents the sound pressure drop due to the parasitic vibration in the display device 1 according to the above-described embodiment, and a curve shown as a dotted line represents the sound pressure drop due to the parasitic vibration in the display device according to the comparative example. According to an embodiment, as the parasitic vibration is suppressed, the sound pressure due to the interference between the sound channels is shown to decrease. In the display device 1 according to the embodiment, since the sound pressure due to the interference between the sound channels decreases, the sound pressure of each sound channel may be increased.

Referring to FIG. 8, a curve shown as a solid line represents the entire harmonic distortion ("THD") due to the parasitic vibration in the display device 1 according to the above-described embodiment, and a curve shown as a dotted line represent the THD due to the parasitic vibration in the display device according to the comparative example. As shown, in the display device 1 according to the embodiment compared to the display device according to the comparative example, the THD was shown to be lower over almost the entire frequency range. This may mean that the distortion due to the parasitic vibration is improved and the sound quality is improved in the display device 1 according to the embodiment.

Figure 9:
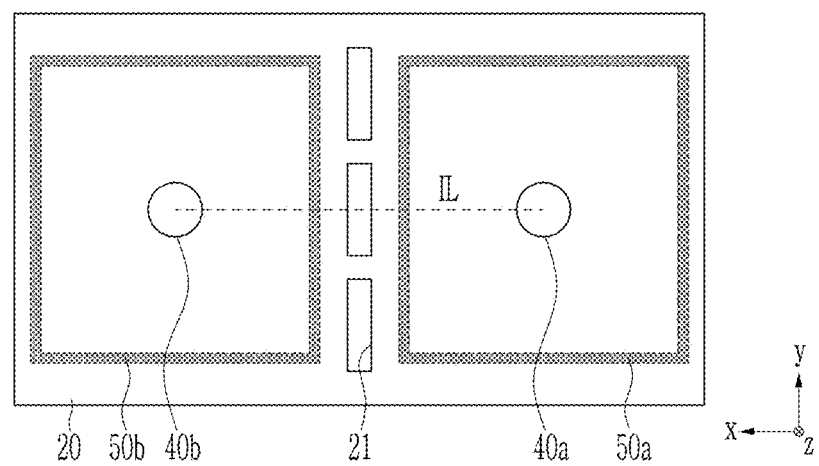
FIG. 9 and FIG. 10 are schematic rear views of a display device according to an embodiment, respectively.
Figure 10:
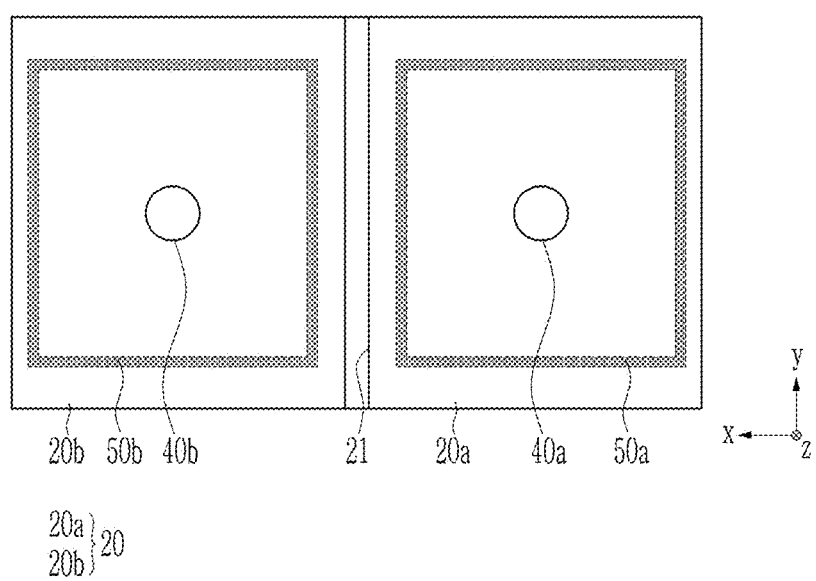

FIG. 9 and FIG. 10 are schematic rear views of a display device according to an embodiment, respectively.

The embodiment of FIG. 9 and the embodiment of FIG. 10 have a difference from the above-described embodiment in the opening 21 formed in the chassis 20. Referring to FIG. 9, the chassis 20 may include a plurality of openings 21 formed between the first region and the second region of the display device 1. The openings 21 may be positioned between the first exciter 40a and the second exciter 40b and may be positioned between the first partition 50a and the second partition 50b. The openings 21 may be disposed in line in the second direction y. One of the openings 21 (e.g., the opening at the center in FIG. 9) may be positioned to intersect the imaginary line IL connecting the first exciter 40a and the second exciter 40b in the first direction x. In this way, when the openings 21 are formed, it is possible to minimize the deterioration of the rigidity of the chassis 20 in the approximate central portion of the display device 1 while suppressing the parasitic vibration.

Referring to FIG. 10, the opening 21 may be formed to extend in the second direction y from the top end to the bottom end of the chassis 20. Accordingly, the chassis 20 may be separated into the first portion 20a and the second portion 20b by the interval of the opening 21. The first exciter 40a may be fixed to the first portion 20a, and the second exciter 40b may be fixed to the second portion 20b. The first partition 50a may be positioned between the display panel 10 and the first portion 20a, and the second partition 50b may be positioned between the display panel 10 and the second portion 20b. The first portion 20a and the second portion 20b may independently support the display panel 10 and the exciters 40a and 40b. In this way, when the chassis 20 is completely separated into the first portion 20a and the second portion 20b corresponding to the first region 10a and the second region 10b of the display panel 10, respectively, the vibration of the first region 10a and the second region 10b corresponding to two sound channels through the chassis 20 may be prevented from propagating through the chassis 20.

Figure 11:
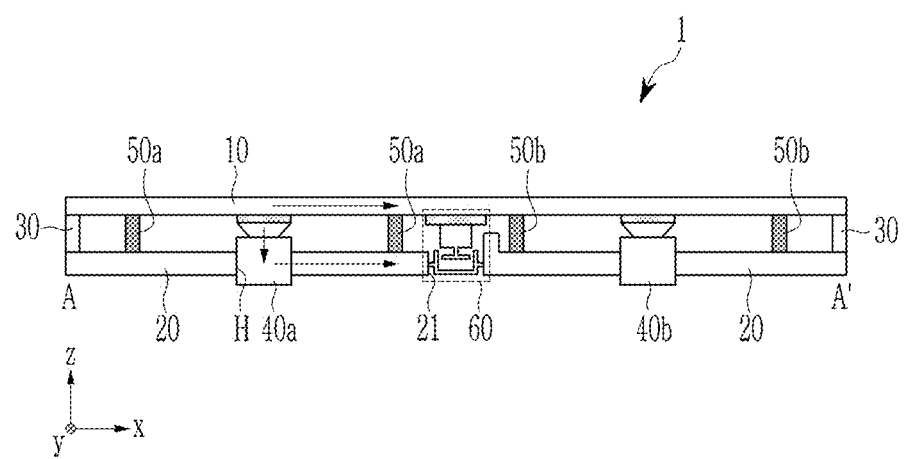
FIG. 11 is a schematic cross-sectional view of a display device according to an embodiment.

FIG. 11 is a schematic cross-sectional view of a display device according to an embodiment.

The region shown in FIG. 11 may correspond to the cross-section taken along line A-A' of FIG. 1. The display device 1 may include a damper 60 disposed at the position where the opening 21 is formed in the above-described embodiments. The damper 60 is positioned overlapping the opening 21 in a plan view and may be connected to the display panel 10 and the chassis 20. The damper 60 may be attached to the display panel 10 by an adhesive member. The damper 60 may be positioned between the first partition 50a and the second partition 50b. When the chassis 20 is separated into the first portion 20a and the second portion 20b by the opening 21 (refer to FIG. 10), the damper 60 may be positioned between the first portion 20a and the second portion 20b.

The vibration of one region (e.g., first region 10a) in the display panel 10 may be propagated to the other region (e.g., second region 10b) in the display panel 10 through the display panel 10 as well as the chassis 20. Since the display panel 10 provides the screen SR exposed to the front of the display device 1, it is difficult to form a cutout for suppressing the vibration propagation, like the opening 21 of the chassis 20. By installing the damper 60 between the first region 10a and the second region 10b of the display panel 10 by using the opening 21 of the chassis 20, the vibration propagation between the first region 10a and the second region 10b through the display panel 10 may be suppressed. The damper 60 may be a tuned mass damper, and may absorb vibration energy to suppress the propagation of the vibration.

Figure 12:
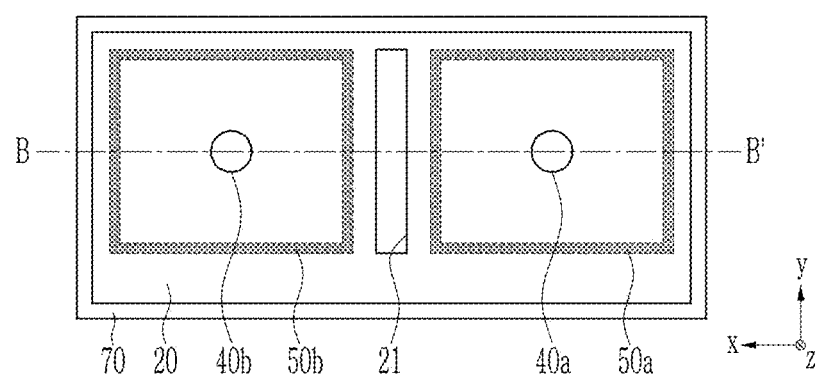
FIG. 12 and FIG. 13 are schematic rear views of a display device according to an embodiment, respectively.
Figure 13:
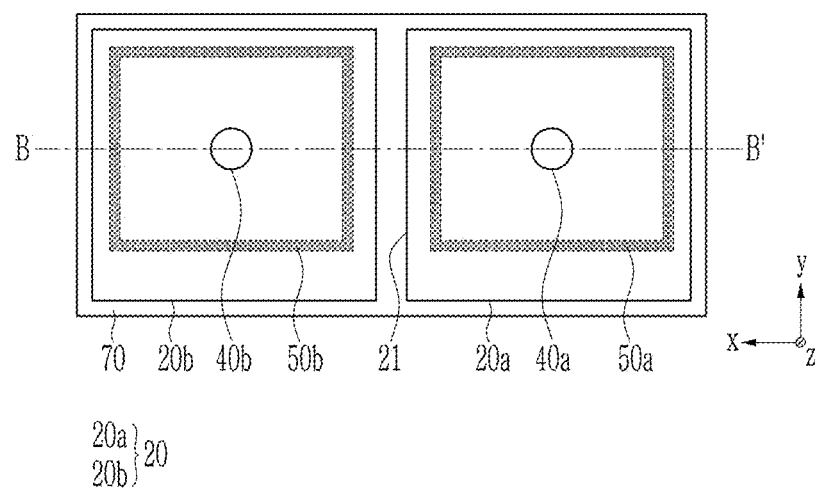
Figure 14:
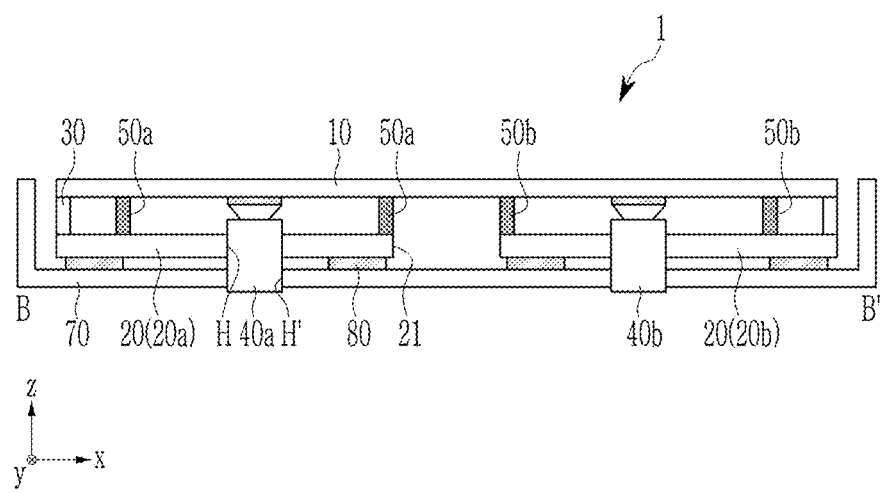
FIG. 14 is a schematic cross-sectional view taken along line B-B' in FIG. 12 or FIG. 13.

FIG. 12 and FIG. 13 are schematic rear views of a display device according to an embodiment, respectively, and FIG. 14 is a schematic cross-sectional view taken along line B-B' in FIG. 12 or FIG. 13.

The display device 1 as shown in FIG. 12, may include a chassis 20 in which the opening 21 is formed to be spaced apart at a predetermined interval from the top and bottom of the chassis 20. The display device 1 as shown in FIG. 13 may include the chassis 20 of which the opening 21 is formed to extend from the top to the bottom of the chassis 20 to be separated into the first portion 20a and the second portion 20b. By forming the opening 21 long in the second direction y, it may be advantageous to suppress the vibration propagation through the chassis 20, but the rigidity in the central portion of the chassis 20 may deteriorate due to the opening 21, and the supporting power of the display panel 10 may deteriorate. Moreover, if the chassis 20 is separated into two portions 20a and 20b as shown in FIG. 12, the central portion of the display panel 10 may be difficult to be supported by the chassis 20.

In order to compensate for the deterioration of the rigidity of the chassis 20 due to the opening 21, the display device 1 may further include a cover 70 positioned on the rear surface of the chassis 20. The cover 70 may include a material such as a metal, a metal alloy, glass, plastic, or fiber-reinforced plastic. The cover 70 may be entirely flat. It may include a portion surrounding the edge of the chassis 20, or the edge of the chassis 20 and the edge of the display panel 10. The chassis 20 or the first portion 20a and the second portion 20b of the chassis 20 may be attached to the cover 70 by the adhesive member 80. The adhesive member 80 may be a foam tape that may be advantageous in absorbing vibration, but is not limited thereto. By attaching the chassis 20 to the cover 70, the display panel 10 may be supported by the chassis 20 and the cover 70.

On the other hand, the exciters 40a and 40b may be inserted and fixed in the hole H provided in the chassis 20 and the hole H' provided in the cover 70. A part of the exciters 40a and 40b may pass through the cover 70 and be protruded to the back side (i.e., rear side facing a direction opposite to the third direction z) of the display device 1. Unlike as shown, the exciters 40a and 40b are inserted and fixed only in the hole H provided in the chassis 20, and may be covered by the cover 70.

Figure 15:
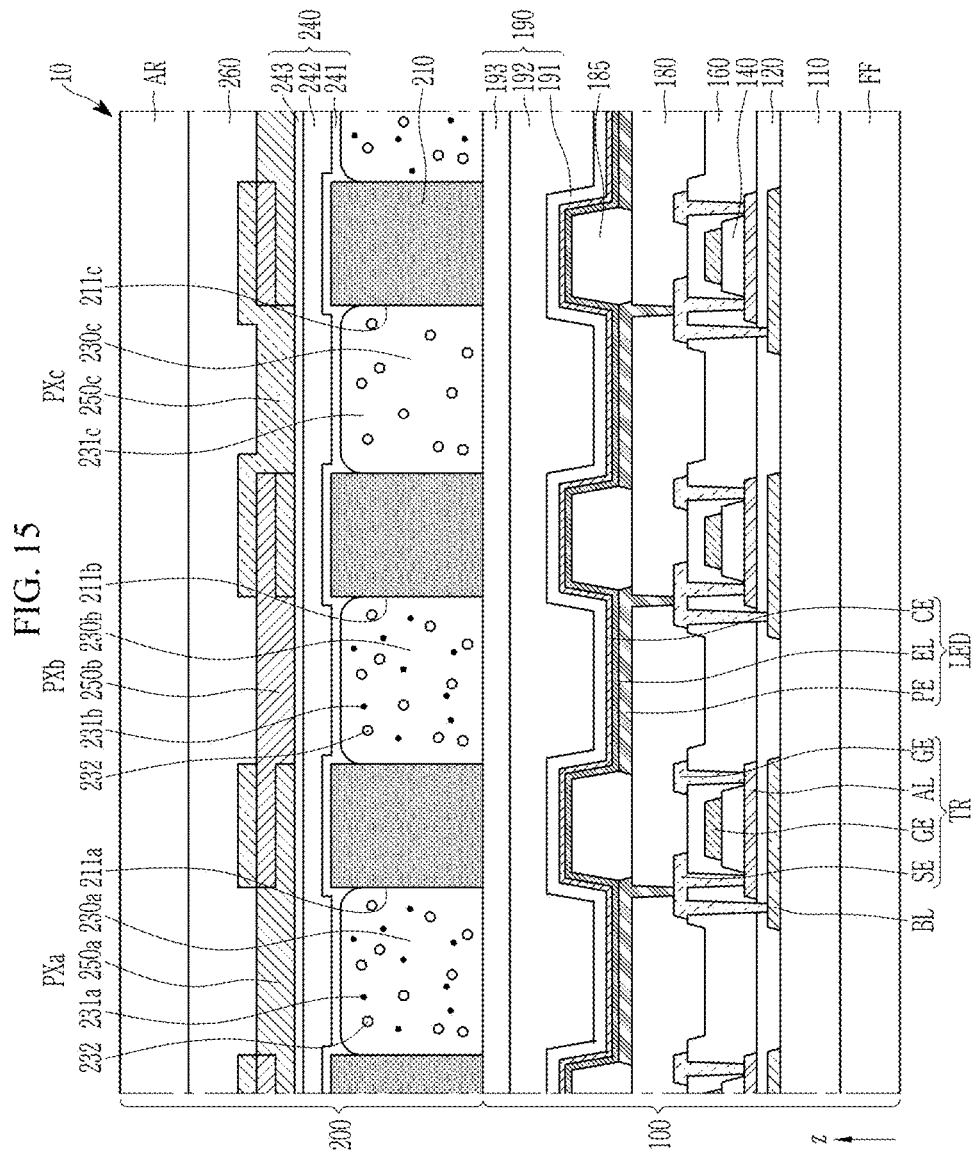
FIG. 15 is a schematic cross-sectional view of a display panel in a display device according to an embodiment.

FIG. 15 is a schematic cross-sectional view of a display panel in a display device according to an embodiment.

Referring to FIG. 15, the cross-section of the region where three pixels PXa, PXb, and PXc are disposed on the display panel 10 is shown. The pixels PXa, PXb, and PXc may include a first pixel PXa, a second pixel PXb, and a third pixel PXc representing different colors. For example, the first pixel PXa may emit red light, the second pixel PXb may emit green light, and the third pixel PXc may emit blue light. In the region (the display area) corresponding to the screen SR of the display panel 10, the first pixel PXa, the second pixel PXb, and the third pixel PXc may be repeatedly disposed over the first direction x and the second direction y.

The display panel 10 may include a display unit 100 and a color conversion unit 200. The color conversion unit 200 may be positioned on the display unit 100, and the color conversion unit 200 may overlap the display unit 100 as a whole in a plan view.

The display unit 100 may include a light emitting diode LED corresponding to each of the pixels PXa, PXb, and PXc. The color conversion unit 200 may convert the wavelength of the light emitted from the light emitting diode LED and emit it to the outside of the display panel 10.

The display unit 100 may basically include a substrate 110, a transistor TR formed on the substrate 110, and a light emitting diode LED connected to the transistor TR.

The substrate 110 may include a material having a rigid characteristic, such as glass, or a material having a flexible characteristic, such as plastic. For example, the substrate 110 may be a glass substrate.

A light blocking layer BL may be positioned on the substrate 110. The light blocking layer BL prevents external light from reaching the semiconductor layer AL of the transistor TR, thereby preventing a characteristic deterioration of the semiconductor layer AL. By the light blocking layer BL, in the transistor TR, particularly an emissive display device, it is possible to control a leakage current of a driving transistor whose a current characteristic is important. The light blocking layer BL may include a material that does not transmit light in the wavelength band to be blocked. For example, the light blocking layer BL may include a metal such as copper (Cu), aluminum (Al), molybdenum (MO), titanium (Ti), tungsten (W), or the like, and may be a single layer or multiple layers. For example, the light blocking layer BL may have a double-layer structure such as titanium (Ti)/copper (Cu). The light blocking layer BL may function as an electrode to which a specific voltage is applied in the display panel 10. In this case, a current change rate in a saturation region of a voltage-current characteristic graph of the transistor TR is reduced, so that the characteristic as a driving transistor may be improved.

A buffer layer 120 may be positioned on the substrate 110 and the light blocking layer BL. The buffer layer 120 improves the characteristics of the semiconductor layer AL by blocking an impurity from the substrate 110 when the semiconductor layer AL is formed, and may relieve the stress of the semiconductor layer AL by flattening the surface of the substrate 110. The buffer layer 120 may include an inorganic insulating material such as a silicon nitride ($SiN_x$), a silicon oxide ($SiO_x$), or a silicon oxynitride ($SiO_xN_y$). The buffer layer 120 may include amorphous silicon.

The semiconductor layer AL may be positioned on the buffer layer 120. The semiconductor layer AL may include a first region, a second region, and a channel region between these regions. The semiconductor layer AL may include an oxide semiconductor. For example, the semiconductor layer AL is an oxide semiconductor such as IGZO (indium-gallium-zinc oxide) including at least one of zinc (Zn), indium (In), gallium (Ga), tin (Sn), and a mixture thereof. The semiconductor layer AL may include polycrystalline silicon or amorphous silicon, for example low temperature polysilicon ("LTPS").

A gate insulating layer 140 may be positioned on the semiconductor layer AL. The gate insulating layer 140 may be formed in a region overlapping the gate electrode GE in a plan view. Such a structure may be formed by etching the gate insulating layer 140 during a photolithography process for forming the gate electrode GE. Alternatively, it may be formed to substantially cover the entire substrate 110. The gate insulating layer 140 may include an inorganic insulating material such as a silicon oxide, a silicon nitride, or a silicon oxynitride, and may be a single layer or multiple layers.

The gate electrode GE may be positioned on the gate insulating layer 140. The gate electrode GE may overlap the channel region of the semiconductor layer AL in a plan view. The gate electrode GE may include a metal such as molybdenum (Mo), aluminum (Al), copper (Cu), or titanium (Ti), and may be a single layer or multiple layers. For example, the gate electrode GE may have a double layer structure such as titanium (Ti)/copper (Cu). The aforementioned first gate line GL1 and/or second gate line GL2 may be on the same layer as the gate electrode GE. The same layer or the formation of the same layer in this specification may mean that the corresponding constituent elements are formed of the same material in the same process (e.g., the same photolithography process).

An interlayer insulating layer 160 may be positioned on the gate electrode GE. The interlayer insulating layer 160 may include an inorganic insulating material such as a silicon oxide, a silicon nitride, or a silicon oxynitride, and may be a single layer or multiple layers.

A first electrode SE and a second electrode DE of the transistor TR may be positioned on the interlayer insulating layer 160. One of the first electrode SE and the second electrode DE may be a source electrode of the transistor TR, and the other may be a drain electrode of the transistor TR. The first electrode SE and the second electrode DE may be connected to the first region and the second region of the semiconductor layer AL, respectively, through a contact hole formed in the interlayer insulating layer 160. The first electrode SE or the second electrode DE may be connected to the light blocking layer BL through a contact hole formed in the interlayer insulating layer 160, the gate insulating layer 140, and the buffer layer 120. The first electrode SE and the second electrode DE may include a metal such as aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and copper (Cu), and may be a single layer or multiple layers. For example, the first electrode SE and the second electrode DE may have a double-layer structure such as titanium (Ti)/copper (Cu), or a triple-layer structure such as titanium (Ti)/aluminum (Al)/ titanium (Ti).

The semiconductor layer AL, the gate electrode GE, the first electrode SE, and the second electrode DE may constitute the transistor TR.

A planarization layer 180 may be positioned on the first electrode SE and the second electrode DE. The planarization layer 180 may include an organic insulating material such as a general-purpose polymer such as poly(methyl methacrylate) and polystyrene, a derivative of a polymer having a phenolic group, an acryl-based polymer, an imide-based polymer (e.g., polyimide), and a siloxane-based polymer.

On the planarization layer 180, the pixel electrode PE of the light emitting diode LED may be positioned. The pixel electrode PE may be connected to the second electrode DE through a contact hole formed in the planarization layer 180. The pixel electrode PE may be formed of a reflective conductive material or a semi-transparent conductive material, or may be formed of a transparent conductive material. The pixel electrode PE may include a transparent conductive material such as indium tin oxide ("ITO") or indium zinc oxide ("IZO"). The pixel electrode PE may include a metal such as lithium (Li), calcium (Ca), aluminum (Al), silver (Ag), magnesium (Mg), or gold (Au). The pixel electrode PE may have a multi-layered structure, and for example, may have a triple-layer structure such as ITO/silver (Ag)/ITO.

A pixel defining layer 185 defining an opening overlapping with the pixel electrode PE in a plan view may be positioned on the planarization layer 180. The pixel defining layer 185 may include an organic insulating material such as an acryl-based polymer, an imide-based polymer, or an amide-based polymer. The pixel defining layer 185 may include a colored pigment such as a black pigment or a blue pigment. For example, the pixel defining layer 185 may include a polyimide binder and a pigment mixed with red, green, and blue. The pixel defining layer 185 may include a cardo binder resin and a mixture of lactam black pigment and blue pigment. The pixel defining layer 185 may include a carbon black. The pixel defining layer 185 including the black pigment may improve the contrast ratio and prevent a reflection by the underlying metal layer.

An emission layer EL may be positioned on the pixel electrode PE and the pixel defining layer 185. The emission layer EL may be in contact with the pixel electrode PE through the opening of the pixel defining layer 185. Contrary to what is shown, the emission layer EL may be positioned within the opening of the pixel defining layer 185. The emission layer EL may include a light emitting material that emits blue light. The emission layer EL may include a light emitting material that emits red light or green light in addition to blue light. On the pixel electrode PE, in addition to the emission layer EL, at least one of a hole injection layer, a hole transport layer, an electron transport layer, and an electron injection layer may be positioned.

A common electrode CE may be positioned on the emission layer EL. The common electrode CE may be positioned across the pixels PXa, PXb, and PXc. The common electrode CE may include a metal such as calcium (Ca), barium (Ba), magnesium (Mg), aluminum (Al), silver (Ag), platinum (Pt), palladium (Pd), gold (Au), nickel (Ni), neodymium (Nd), iridium (Ir), chromium (Cr), and lithium (Li). The common electrode CE may include a transparent conductive oxide such as indium tin oxide (ITO) or indium zinc oxide (IZO).

The pixel electrode PE, the emission layer EL, and the common electrode CE may constitute a light emitting diode LED, which may be an organic light emitting diode. The pixel electrode PE is provided individually for each pixel PXa, PXb, and PXc to receive a driving current. The common electrode CE may be provided in common to the pixels PXa, PXb, and PXc to receive a common voltage. The pixel electrode PE may be an anode that is a hole injection electrode, and the common electrode CE may be a cathode that is an electron injection electrode, and vice versa. The opening of the pixel defining layer 185 may correspond to a light emitting region of the light emitting diode LED.

A display part encapsulation layer 190 (hereinafter, simply referred to as a first encapsulation layer) may be positioned on the common electrode CE. The first encapsulation layer 190 may seal the light emitting diodes (LEDs) and may prevent a penetration of moisture or oxygen from the outside. The first encapsulation layer 190 covers the entire display area, and an edge of the first encapsulation layer 190 may be positioned in the non-display area. The first encapsulation layer 190 may be a thin film encapsulation layer including a first inorganic layer 191 and a second inorganic layer 193, and an organic layer 192. The first inorganic layer 191 and the second inorganic layer 193 may mainly prevent penetration of moisture, etc., and the organic layer 192 may mainly planarize the surface of the first encapsulation layer 190, particularly the surface of the second inorganic layer 193 in the display area. The first inorganic layer 191 and the second inorganic layer 193 may include an inorganic insulating material such as a silicon oxide and a silicon nitride. The organic layer 192 may include an organic material such as an acryl-based resin, a methacrylic resin, polyisoprene, a vinyl-based resin, an epoxy-based resin, a urethane-based resin, a cellulose-based resin, or a perylene-based resin.

The color conversion unit 200 may include a bank 210, a reflective layer 220, first and second color conversion layers 230a and 230b and a transmission layer 230c, a color conversion part encapsulation layer 240, color filters 250a, 250b, and 250c, and an overcoat layer 260.

The bank 210 may be positioned on the display unit 100. For example, the bottom surface of the bank 210 may be in contact with the top surface of the first encapsulation layer 190. The bank 210 may overlap the pixel defining layer 185 in a plan view. The bank 210 may not overlap the light emitting diode LED, or may not overlap very much in a plan view. The bank 210 may be positioned at the boundary of the pixels PXa, PXb, and PXc. The bank 210 may partition the pixel area. The bank 210 may define openings 211a, 211b, and 211c overlapping the light emitting diodes LEDs. The openings 211a, 211b, and 211c may penetrate the bank 210 in the third direction z. The openings 211a, 211b, and 211c may include a first opening 211a overlapping the light emitting diode LED corresponding to the first pixel PXa, a second opening 211b overlapping the light emitting diode LED corresponding to the second pixel PXb, and a third opening 211c overlapping the third pixel PXc corresponding the light emitting diode LED in a plan view. The bank 210 may include an organic material such as an acryl-based polymer, an epoxy-based polymer, an imide-based polymer, an olefin-based polymer, or an amide-based polymer. The bank 210 may include colored pigments such as black pigments and blue pigments. The bank 210 may be transparent.

A first color conversion layer 230a, a second color conversion layer 230b, and a transmission layer 230c may be positioned in the first opening 211a, the second opening 211b, and the third opening 211c, respectively. The first color conversion layer 230a may overlap the light emitting diode LED corresponding to the first pixel PXa and may convert light incident from the light emitting diode LED into light of a first wavelength. The light of the first wavelength may be red light having a maximum emission peak wavelength of about 600 nanometers (nm) to about 650 nm, for example about 620 nm to about 650 nm. The second color conversion layer 230b may overlap the light emitting diode LED corresponding to the second pixel PXb and may convert light incident from the light emitting diode LED into light having a second wavelength. The light of the second wavelength may be green light having a maximum emission peak wavelength of about 500 nm to about 550 nm, for example about 510 nm to about 550 nm. The transmission layer 230c may overlap the light emitting diode LED corresponding to the third pixel PXc and transmit light incident from the light emitting diode LED in a plan view. The light passing through the transmission layer 230c may be light of a third wavelength. The light of the third wavelength may be blue light having a maximum emission peak wavelength of about 380 nm to about 480 nm, for example about 420 nm or more, about 430 nm or more, about 440 nm or more, or about 445 nm or more, and about 470 nm or less, about 460 nm or less, or about 455 nm or less.

The first color conversion layer 230a and the second color conversion layer 230b may include first quantum dots 231a and second quantum dots 231b, respectively. For example, light incident to the first color conversion layer 230a may be converted into light of the first wavelength by the first quantum dots 231a and emitted. Light incident to the second color conversion layer 230b may be converted into light of a second wavelength by the second quantum dots 231b and emitted. The first color conversion layer 230a, the second color conversion layer 230b, and the transmission layer 230c may include scatterers 232. The scatterers 232 may scatter light incident to the first color conversion layer 230a, the second color conversion layer 230b, and the transmission layer 230c, thereby improving light efficiency.

The scatterers 232 may be metal oxide particles and/or organic particles. The metal oxide may be exemplified by $TiO_2$, $ZrO_2$, $Al_2O_3$, $In_2O_3$, $ZnO$, $SnO_2$, or the like. The material of the organic particles may be exemplified by an acryl-based resin, a urethane-based resin, or the like. The scatterers 232 may scatter light in a random direction regardless of the incident direction of the incident light.

The first quantum dots 231a and the second quantum dots 231b (hereinafter, the quantum dot is referred to as a semiconductor nanocrystal) may each independently include a Group II-VI compound, a Group III-V compound, a Group IV-VI compound, a Group IV element or compound, a Group I-III-VI compound, a Group II-III-VI compound, a Group I-II-IV-VI compound, or combinations thereof.

The Group II-VI compound may be selected from a group including a binary compound selected from a group consisting of CdSe, CdTe, ZnS, ZnSe, ZnTe, ZnO, HgS, HgSe, HgTe, MgSe, MgS, and a mixture thereof; a ternary compound selected from a group consisting of AgInS, CuInS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary compound selected from a group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group II-VI compound may further include a Group III metal.

The Group III-V compound may be selected from a group including a binary compound selected from a group consisting of GaN, GaP, GaAs, GaSb, AlN, AlP, AlAs, AlSb, InN, InP, InAs, InSb, and a mixture thereof; a ternary compound selected from a group consisting of GaNP, GaNAs, GaNSb, GaPAs, GaPSb, AlNP, AlNAs, AlNSb, AlPAs, AlPSb, InGaP, InNP, InNAs, InNSb, InPAs, InZnP, InPSb, and a mixture thereof; and a quaternary compound selected from a group consisting of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, InZnP, and a mixture thereof. The Group III-V compound may further include a Group II metal (e.g., InZnP).

The Group IV-VI compound may be selected from a group including a binary compound selected from a group consisting of SnS, SnSe, SnTe, PbS, PbSe, PbTe, and a mixture thereof; a ternary compound selected from a group consisting of SnSeS, SnSeTe, SnSTe, PbSeS, PbSeTe, PbSTe, SnPbS, SnPbSe, SnPbTe, and a mixture thereof; and a quaternary compound selected from a group consisting of SnPbSSe, SnPbSeTe, SnPbSTe, and a mixture thereof.

The Group IV element or compound may be selected from a group including a single element compound selected from a group consisting of Si, Ge, and combinations thereof; and a binary element compound selected from a group consisting of SiC, SiGe, and combinations thereof.

The Group I-III-VI compound may be selected from a group including $CuInSe_2$, $CuInS_2$, CuInGaSe, and CuInGaS, however it is not limited thereto.

The Group II-III-VI compound may be selected from a group consisting of ZnGaS, ZnAlS, ZnInS, ZnGaSe, ZnAlSe, ZnInSe, ZnGaTe, ZnAlTe, ZnInTe, ZnGaO, ZnAlO, ZnInO, HgGaS, HgAlS, HgInS, HgGaSe, HgAlSe, HgInSe, HgGaTe, HgAlTe, HgInTe, MgGaS, MgAlS, MgInS, MgGaSe, MgAlSe, MgInSe, and combinations thereof.

The Group I-II-IV-VI compound may be selected from CuZnSnSe and CuZnSnS.

The quantum dot may not include cadmium. The quantum dots may include a semiconductor nanocrystal based on a Group III-V compound including indium and phosphorus. The Group III-V compound may further include zinc. The quantum dots may include a semiconductor nanocrystal based on a Group II-VI compound including a chalcogen element (e.g., sulfur, selenium, tellurium, or combinations thereof) and zinc.

In the quantum dots, the binary compound, the ternary compound, or the quaternary compound as above-described may be present in the particle at a uniform concentration or in the same particle of which a concentration distribution may be partially divided into different states. Also, they may have a core/shell structure in which one quantum dot surrounds another quantum dot. The interface between the core and the shell may have a concentration gradient in which the concentration of the elements present in the shell decreases toward the center.

In some embodiments, the quantum dots may have a core-shell structure including a core including the above-described nanocrystal and a shell surrounding the core. The shell of the quantum dot may act as a protective layer for maintaining the semiconductor characteristic by preventing a chemical modification of the core and/or a charging layer for imparting an electrophoretic characteristic to the quantum dot. The shell may be single-layered or multi-layered. The interface between the core and the shell may have a concentration gradient in which the concentration of elements presents in the shell decreases toward the center. Examples of the shell of the quantum dot include a metal or non-metal oxide, a semiconductor compound, or a combination thereof.

For example, the metal or non-metal oxide may be exemplified as a binary compound such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, and NiO, or a ternary compound such as $MgAl_2O_4$, $CoFe_2O_4$, $NiFe_2O_4$, and $CoMn_2O_4$.

For example, the metal or non-metal oxide may be exemplified as a binary compound such as $SiO_2$, $Al_2O_3$, $TiO_2$, ZnO, MnO, $Mn_2O_3$, $Mn_3O_4$, CuO, FeO, $Fe_2O_3$, $Fe_3O_4$ CoO, $Co_3O_4$, and NiO, or a ternary compound such as $MgAl_2O_4$, $CoFe_2O_4$, $NiFe_2O_4$, and $CoMn_2O_4$.

The quantum dots may have a full width at half maximum ("FWHM") of about 45 nm or less, preferably about 40 nm or less, more preferably about 30 nm or less, and may improve color purity or color reproducibility in this range. Also, since light emitted through the quantum dots is emitted in all directions, a wide viewing angle may be improved.

In the quantum dots, the shell material and the core material may have different energy bandgaps from each other. For example, the energy bandgap of the shell material may be greater than that of the core material. The quantum dots may have a multi-layered shell. In the multi-layered shell, the energy bandgap of the outer layer may be greater than the energy bandgap of the inner layer (i.e., the layer nearer to the core). In the multi-layered shell, the energy bandgap of the outer layer may be less than the energy bandgap of the inner layer.

The shape of the quantum dot is not specially limited. For example, the shape of the quantum dot may include a sphere, a polyhedron, a pyramid, a multipod, a square, a cuboid, a nanotube, a nanorod, a nanowire, a nanosheet, or a combination thereof.

The quantum dots may include an organic ligand (e.g., having a hydrophobic moiety). The organic ligand moiety may be bound to surfaces of the quantum dots. The organic ligand moiety may include RCOOH, $RNH_2$, $R_2NH$, $R_3N$, RSH, $R_3PO$, $R_3P$, ROH, RCOOR, $RPO(OH)_2$, RHPOOH, $R_2POOH$, or combinations thereof. Herein, R is independently a C3 to C40 substituted or unsubstituted aliphatic hydrocarbon group such as a C3 to C40 (e.g., C5 or greater and C24 or smaller) substituted or unsubstituted alkyl, or a substituted or unsubstituted alkenyl, a C6 to C40 (e.g., C6 or greater and C20 or smaller) substituted or unsubstituted aromatic hydrocarbon group such as a substituted or unsubstituted C6 to C40 aryl group, or a combination thereof.

Examples of the organic ligand may be a thiol compound such as methane thiol, ethane thiol, propane thiol, butane thiol, pentane thiol, hexane thiol, octane thiol, dodecane thiol, hexadecane thiol, octadecane thiol, or benzyl thiol; an amine such as methane amine, ethane amine, propane amine, butane amine, pentyl amine, hexyl amine, octyl amine, nonylamine, decylamine, dodecyl amine, hexadecyl amine, octadecyl amine, dimethyl amine, diethyl amine, dipropyl amine, tributylamine, or trioctylamine; a carboxylic acid compound such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, or benzoic acid; a phosphine compound such as methyl phosphine, ethyl phosphine, propyl phosphine, butyl phosphine, pentyl phosphine, octyl phosphine, dioctyl phosphine, tributyl phosphine, or trioctyl phosphine; a phosphine compound or an oxide compound thereof such methyl phosphine oxide, ethyl phosphine oxide, propyl phosphine oxide, butyl phosphine oxide pentyl phosphine oxide, tributyl phosphine oxide, octyl phosphine oxide, dioctyl phosphine oxide, or trioctyl phosphine oxide; a diphenyl phosphine, a triphenyl phosphine compound, or an oxide compound thereof; a C5 to C20 alkyl phosphonic acid such as hexylphosphinic acid, octylphosphinic acid, dodecanephosphinic acid, tetradecanephosphinic acid, hexadecanephosphinic acid, or octadecanephosphinic acid. The quantum dots may include a hydrophobic organic ligand alone or in a mixture of at least two types. The hydrophobic organic ligand may not include a photopolymerizable moiety (e.g., an acrylate group, a methacrylate group, etc.).

On the bank 210, the reflective layer 220, the first and second color conversion layers 230a and 230b and the transmission layer 230c, and a color conversion part encapsulation layer 240 (hereinafter, referred to as a second encapsulation layer) may be positioned. The second encapsulation layer 240 may encapsulate the reflective layer 220, the first and second color conversion layers 230a and 230b, and the transmission layer 230c. The second encapsulation layer 240 may be a thin film encapsulation layer including the first inorganic layer 241, the organic layer 242, and the second inorganic layer 243. The first inorganic layer 241 and the second inorganic layer 243 may mainly prevent penetration of moisture, etc., and the organic layer 242 may mainly planarize the surface of the second encapsulation layer 240, particularly the surface of the second inorganic layer 243. The first inorganic layer 241 and the second inorganic layer 243 may include an inorganic insulating material such as a silicon oxide and a silicon nitride. The organic layer 242 may include an organic material such as acryl-based resin, a methacrylic resin, polyisoprene, a vinyl-based resin, an epoxy-based resin, a urethane-based resin, a cellulose-based resin, or a perylene-based resin.

At least one of the first inorganic layer 241, the organic layer 242, and the second inorganic layer 243 may be a low refractive index layer. For example, the organic layer 242 may be a low refractive index layer, and the organic layer 242 may include an organic material having a low refractive index. The refractive index of the low refractive index layer may be about 1.1 to about 1.3.

Color filters 250a, 250b, and 250c may be positioned on the second encapsulation layer 240. The color filters 250a, 250b, and 250c may overlap the openings of the pixel defining layer 185 in a plan view. The color filters 250a, 250b, and 250c may include a first color filter 250a that transmits light of the first wavelength and absorbs light of the remaining wavelengths, a second color filter 250b that transmits light of the second wavelength and absorb light of the remaining wavelengths, and a third color filter 250c that transmits the light of the third wavelength and absorbs the light of the remaining wavelengths.

The first color filter 250a, the second color filter 250b, and the third color filter 250c may overlap the first color conversion layer 230a, the second color conversion layer 230b, and the transmission layer 230c, respectively in a plan view. The first color filter 250a, the second color filter 250b, and the third color filter 250c may correspond to the first pixel PXa, the second pixel PXb, and the third pixel PXc, respectively. Accordingly, the purity of the light of the first wavelength (corresponding to the first pixel PXa), the light of the second wavelength (corresponding to the second pixel PXb), and the light of the third wavelength (corresponding to the third pixel PXb) emitted to the outside of the display panel 10 may be raised. The light of the first wavelength, the light of the second wavelength, and the light of the third wavelength may be red light, green light, and blue light, respectively.

At the boundary of the pixels PXa, PXb, and PXc, the first color filter 250a, the second color filter 250b, and the third color filter 250c may overlap each other to form a light blocking region in a plan view. As illustrated, the first color filter 250a, the second color filter 250b, and the third color filter 250c may all overlap to form a light blocking region, but two color filters may overlap to form a light blocking region. For example, the first color filter 250a and the second color filter 250b may overlap at the boundary between first pixel PXa and the second pixel PXb, the second color filter 250b and the third color filter 250c may overlap at the boundary between the second pixel PXb and the third pixel PXc, and the third color filter 250c and the first color filter 250a may overlap at the boundary between the third pixel PXc and the first pixel PXa in a plan view. The first color filter 250a, the second color filter 250b, and the third color filter 250c are stacked in the order on the second encapsulation layer 240, but they may be stacked in a different order. Instead of overlapping the color filters 250a, 250b, and 250c in a plan view, a light blocking member including a black pigment or dye may be formed to provide a light blocking region.

An overcoat layer 260 may be positioned over the color filters 250a, 250b, and 250c. The overcoat layer may include an inorganic insulating material and/or an organic insulating material, and may be a single layer or multiple layers.

The display panel 10 may further include an anti-reflective film AR positioned on the color conversion unit 200 and a functional film FF positioned below the display unit 100. The anti-reflective film AR may be attached to the color conversion unit 200. The anti-reflective film AR may include a polarization layer and a phase retardation layer. The functional film FF may be attached to the display unit 100. The functional film FF may include a structure capable of protecting the display panel 10 from a rear environment or dissipating heat generated from the display panel 10, such as a cushion layer, a shielding layer, and a heat dissipation layer.

In the display panel 10 having the structure as described above, since the color conversion unit 200 is formed on a separate substrate and is not bonded to the display unit 100, but is formed on the display unit 100, it is possible to reduce the thickness and the weight of the display panel 10 and to reduce the manufacturing cost. In addition, since the distance between the light emitting diode LED of the light source, and the color conversion layers 230a and 230b and the transmission layer 230c, is close as the degree of the thickness of the first encapsulation layer 190, the light loss may be reduced and the light efficiency may be increased. Contrary to the illustration, the color conversion unit 200 may be formed on a separate substrate and bonded to the display unit 100.

While this disclosure has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A display device comprising:
   a display panel including a first region and a second region;
   a chassis disposed on a rear surface of the display panel;
   a first exciter in contact with the first region and fixed to the chassis; and
   a second exciter in contact with the second region and fixed to the chassis; and
   a damper overlapping the opening in a plan view and connected to the display panel and the chassis,
   wherein the chassis defines an opening disposed between the first exciter and the second exciter.

2. The display device of claim 1, wherein
   the first exciter and the second exciter are disposed in a line in a first direction, and
   the opening extends in a second direction intersecting the first direction.

3. The display device of claim 1, further comprising:
   a first partition disposed between the display panel and the chassis and surrounding the first exciter; and
   a second partition disposed between the display panel and the chassis and surrounding the second exciter, and
   the opening is disposed between the first partition and the second partition.

4. The display device of claim 3, wherein
   the first partition and the second partition are spaced apart from each other.

5. The display device of claim 1, wherein
   in a direction in which the opening extends, the opening is formed spaced apart from one end and an opposite end of the chassis.

6. The display device of claim 1, wherein
   the opening is provided in plural between the first exciter and the second exciter.

7. The display device of claim 6, wherein
   the first exciter and the second exciter are disposed in a line in a first direction, and
   the plurality of openings are disposed in a line in a second direction intersecting the first direction.

8. The display device of claim 7, wherein
   one of the plurality of openings intersects an imaginary line connecting the first exciter and the second exciter.

9. The display device of claim 1, wherein
   the opening extends from one end of the chassis to an opposite end of the chassis, and
   the chassis is completely divided into a first portion and a second portion by the opening.

10. The display device of claim 1, further comprising
    a first partition surrounding the first exciter and a second partition surrounding the second exciter, and
    wherein the damper is disposed between the first partition and the second partition.

11. The display device of claim 1, wherein
    the first exciter and the second exciter each include a portion inserted into a hole defined in the chassis.

12. The display device of claim 1, wherein
    the first exciter and the second exciter are in contact with the display panel through an adhesive member disposed between the display panel and the first exciter and disposed between the display panel and the second exciter.

13. The display device of claim 1, wherein
    the first exciter and the second exciter are directly in contact with the display panel.

14. The display device of claim 1, further comprising
    a cover disposed on the rear surface of the chassis, and
    the chassis is attached to the cover by an adhesive member.

15. The display device of claim 14, wherein
    the first exciter and the second exciter each include a portion inserted into a hole defined in the cover.

16. A display device comprising:
    a display panel providing a screen to display images;
    a chassis including a first portion and a second portion disposed on a rear surface of the display panel and separated from each other;
    a first exciter in contact with the display panel and fixed to the first portion; and
    a second exciter in contact with the display panel and fixed to the second portion,
    wherein the chassis defines an opening disposed between the first exciter and the second exciter that extends from one end of the chassis to an opposite end of the chassis, and
    the chassis is completely divided into the first portion and the second portion by the opening.

17. A display device comprising
    a display panel providing a screen to display images;
    a chassis including a first portion and a second portion disposed on a rear surface of the display panel and separated from each other;
    a first exciter in contact with the display panel and fixed to the first portion;
    a second exciter in contact with the display panel and fixed to the second portion; and
    a damper disposed between the first portion and the second portion and connected to the display panel and the chassis.

18. The display device of claim 16, further comprising a cover disposed on a rear surface of the chassis and to which the chassis is attached.

19. The display device of claim 16, further comprising:
    a first partition disposed between the display panel and the first portion and surrounding the first exciter; and
    a second partition disposed between the display panel and the second portion and surrounding the second exciter, and
    wherein the first partition and the second partition are spaced apart from each other.

* * * * *